US010647275B2

(12) United States Patent
Ushiyama

(10) Patent No.: US 10,647,275 B2
(45) Date of Patent: May 12, 2020

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun, Shiga (JP)

(72) Inventor: Masatoshi Ushiyama, Inukami-gun (JP)

(73) Assignees: FURUKAWA ELECTRIC CO., LTD., Tokyo (JP); FURUKAWA AUTOMOTIVE SYSTEMS INC., Inukami-Gun (JP)

( * ) Notice: Subject to any disclaimer, the term of this patent is extended or adjusted under 35 U.S.C. 154(b) by 0 days.

(21) Appl. No.: 16/089,711

(22) PCT Filed: Mar. 29, 2017

(86) PCT No.: PCT/JP2017/012827
§ 371 (c)(1),
(2) Date: Sep. 28, 2018

(87) PCT Pub. No.: WO2017/170650
PCT Pub. Date: Oct. 5, 2017

(65) Prior Publication Data
US 2019/0118738 A1  Apr. 25, 2019

(30) Foreign Application Priority Data

Mar. 31, 2016  (JP) .................. 2016-070168

(51) Int. Cl.
*H01R 35/04* (2006.01)
*B60R 16/027* (2006.01)
(Continued)

(52) U.S. Cl.
CPC .............. *B60R 16/027* (2013.01); *B62D 1/04* (2013.01); *H01R 13/52* (2013.01);
(Continued)

(58) Field of Classification Search
CPC ....... H01R 35/00; H01R 35/025; H01R 35/04
(Continued)

(56) References Cited

U.S. PATENT DOCUMENTS

| 6,409,527 B1 * | 6/2002 | Adachi ................. B60R 16/027 439/15 |
| 7,175,453 B2 * | 2/2007 | Yajima ................. H01R 35/025 439/15 |

(Continued)

FOREIGN PATENT DOCUMENTS

| CN | 1764022 A | 4/2006 |
| EP | 3 193 409 A1 | 7/2017 |

(Continued)

OTHER PUBLICATIONS

International Preliminary Report on Patentability and English translation of the Written Opinion of the International Searching Authority (Forms PCT/IB/373 and PCT/ISA/237) for International Application No. PCT/JP2017/012827, dated Oct. 2, 2018.

(Continued)

*Primary Examiner* — Hien D Vu
(74) *Attorney, Agent, or Firm* — Birch, Stewart, Kolasch & Birch, LLP

(57) ABSTRACT

The rotary connector device includes a rotator and a stator. The connector housing section of the rotator is formed so as to be capable of holding a rotator side connector configured to enable an electrical connections with the outside, and includes: a connector holding section protruding from the rotator main body of the rotator to the outside of an annular space in the stator; and a cover member that is a member configured to at least partially cover the connector holding section along a direction in which the connector holding section protrudes.

10 Claims, 4 Drawing Sheets

(51) Int. Cl.
  *H01R 13/52* (2006.01)
  *B62D 1/04* (2006.01)
  *H01R 35/02* (2006.01)
  *H01R 13/506* (2006.01)
  *H01R 107/00* (2006.01)

(52) U.S. Cl.
  CPC ....... *H01R 13/5216* (2013.01); *H01R 35/025* (2013.01); *H01R 35/04* (2013.01); *H01R 13/506* (2013.01); *H01R 2107/00* (2013.01); *H01R 2201/10* (2013.01); *H01R 2201/26* (2013.01)

(58) Field of Classification Search
  USPC .............................................. 439/13, 15, 164
  See application file for complete search history.

(56) References Cited

U.S. PATENT DOCUMENTS

| | | | | |
|---|---|---|---|---|
| 7,223,104 B2* | 5/2007 | Suenaga | ................ | H01R 35/04 439/15 |
| 7,488,178 B2* | 2/2009 | Inotsuka | ............... | B60R 16/027 439/15 |
| 7,758,363 B2* | 7/2010 | Tanaka | .................. | B60R 16/027 439/15 |
| 8,758,024 B2* | 6/2014 | Adachi | .................. | H01R 35/04 439/15 |
| 2006/0089035 A1 | 4/2006 | Araki et al. | | |

FOREIGN PATENT DOCUMENTS

| | | |
|---|---|---|
| JP | 5-32222 U | 4/1993 |
| JP | 2001-126836 A | 5/2001 |
| JP | 2001-135443 A | 5/2001 |
| JP | 3676146 B2 | 7/2005 |
| JP | 4540778 B2 | 9/2010 |

OTHER PUBLICATIONS

International Search Report for PCT/JP2017/012827 dated Jun. 20, 2017.
Written Opinion of the International Searching Authority for PCT/JP2017/012827 (PCT/ISA/237) dated Jun. 20, 2017.
Chinese Office Action and Search Report for corresponding Chinese Application No. 201780020688.1, dated Jun. 26, 2019, with an English translation.
Extended European Search Report for corresponding European Application No. 17775187.2, dated Sep. 30, 2019.
Korean Office Action for corresponding Korean Application No. 10-2018-7028678, dated Mar. 18, 2020, with an English translation.

* cited by examiner

ROTARY CONNECTOR DEVICE

CROSS REFERENCE TO RELATED APPLICATIONS

This application is the National Phase of PCT International Application No. PCT/JP2017/012827, filed on Mar. 29, 2017, which claims priority under 35 U.S.C. 119(a) to Patent Application No. 2016-070168, filed in Japan on Mar. 31, 2016, all of which are hereby expressly incorporated by reference into the present application.

TECHNICAL FIELD

The present invention relates to a rotary connector device, and more particularly relates to a rotary connector device used for electrically connecting a steering wheel and a vehicle body with a flat cable.

BACKGROUND ART

In a vehicle such as a four-wheeled automobile, a rotary connector device for supplying electric power to airbag devices or the like is attached to a connecting portion between a steering wheel for steering and a steering shaft. The rotary connector device is attached to surround the steering shaft, and a steering column cover is attached so as to enclose the rotary connector device and the end portion of the steering shaft. In addition, in the steering wheel, a steering lower cover is attached so as to enclose the boss portion of the steering wheel.

In the above steering cover structure, the steering column cover does not rotate with the steering of the steering wheel, whereas the steering lower cover is integrally fixed with the steering wheel, and rotates in accordance with the steering of the steering wheel. The steering column cover and the steering lower cover are disposed at predetermined intervals in the axial direction of the steering shaft such that these covers do not interfere when the steering wheel is steered.

In the above configuration, in the case that a driver accidentally spills a liquid such as a beverage on the steering lower cover, or in the case that dew condensation occurs on the upper wall portion of the steering lower cover, for example, the liquid may flow into the space (interval portion) between the steering column cover and the steering lower cover and reach the rotary connector. As a result, the liquid enters the inside of the rotary connector device, adheres to the inner wall of the rotary connector and the flat cable disposed inside the rotary connector device, and the operation of the steering wheel may become heavy.

Accordingly, in the related art, to prevent drinking water or the like from entering the inside of the rotary connector device, a structure has been proposed in which a gap formed between the rotator and the stator is opened toward the vertical downward direction in the rotary connector device (Patent Document 1).

CITATION LIST

Patent Literature

Patent Document 1: JP H05-32222 UM-A

SUMMARY OF INVENTION

Technical Problem

However, in the known rotary connector devices described above, although the rotary connector devices have a structure in which liquid is less likely to enter the inside of the rotary connector device, liquid may enter a connection portion between the flat cable and the connector that enables electrical connection between the flat cable and the outside, and green rust may occur. As the connector housing section in which the connector of the rotator is housed is provided with a hole for holding the connector and the cable, as well as a groove formed for folding the airbag connection lead cable that extends inward from the connector back to the outside, the liquid that reaches the rotary connector device may enter the connector housing section from the hole or the groove and reach the connecting portion between the flat cable and the connector, and green rust may form on the connection portion.

In addition, green rust may form on the connection portion due to the moisture, salt content, and the like contained in the liquid that reaches the rotary connector device, the electric resistance value at the time of electrification of the rotary connector device may increase and become greater than the desired electric resistance value, and an external device such as an airbag may not operate, or may malfunction. In this way, in known rotary connectors, a higher level of sealing against liquid is required in the connector housing section.

The present invention has been made in view of the above-described problems, and has an object of providing a rotary connector device capable of suppressing liquid from entering a connector housing section and preventing green rust from occurring.

Solution to Problem

To achieve the above objective, a rotary connector device of an aspect of the present invention includes a rotator; a stator that is a member configured to hold the rotator rotatably around an axis line and form an annular space around the axis line between the rotator and the stator; a rotator side connector configured to enable an electrical connection with the outside in the rotator; a stator side connector configured to enable an electrical connection with the outside in the stator; and a flexible cable that is a flexible flat cable configured to be housed within the annular space and electrically connected to the rotator side connector and the stator side connector. The rotator includes a rotator main body that is an annular member surrounding the axis line and a connector housing section that is a space opened to the annular space and the outside of the annular space and forms a connector housing space configured to house the rotator side connector. The connector housing section is configured to allow the rotator side connector to be held and includes a connector holding section protruding from the rotator main body to the outside of the annular space and a cover member that is a member configured to at least partially cover the connector holding section on a peripheral surface along a direction in which the connector holding section protrudes.

In the rotary connector device according to an aspect of the present invention, a concave portion opened to an outer circumferential side is formed in the connector holding section, and the rotator side connector is held in the concave portion, the cover member is a member configured to cover the concave portion from the outer circumferential side, and the connector housing space is formed by the cover member covering the connector holding section.

In the rotary connector device according to an aspect of the present invention, the connector holding section includes the connector housing space in the connector holding section, and the cover member is a member configured to cover an entire peripheral surface of the connector holding section.

In the rotary connector device according to an aspect of the present invention, the connector holding section includes the connector housing space in the connector holding section, and includes a cable groove that is a groove extending from the rotator main body toward the outside of the annular space and in which a cable electrically connecting the rotator side connector and an external device is passed, and the cover member is a member configured to cover the cable groove.

In the rotary connector device according to an aspect of the present invention, the connector holding section is integrally formed with the rotator main body.

In the rotary connector device according to an aspect of the present invention, the cover member is at least partially in close contact with the connector holding section to seal a portion covering the connector holding section.

In the rotary connector device according to an aspect of the present invention, the rotator main body and the connector holding section are formed from a resin material.

Advantageous Effects of Invention

According to the rotary connector device of the present invention, it is possible to suppress liquid from entering the connector housing section and to prevent green rust from occurring.

BRIEF DESCRIPTION OF DRAWINGS

FIG. 2A is a partially exploded perspective view illustrating a rotator side connector housing section of the rotary connector device illustrated in FIG. 1 in a disassembled state, and FIG. 2B is a partially enlarged perspective view illustrating the rotator side connector housing section of the rotary connector device illustrated in FIG. 1 in an assembled state.

FIG. 3A is a partially exploded perspective view illustrating a rotator side connector housing section of the rotary connector device according to a second embodiment of the present invention in a disassembled state, and FIG. 3B is a partially enlarged perspective view illustrating the rotator side connector housing section of the rotary connector device according to the second embodiment of the present invention in an assembled state.

FIG. 4A is a partially exploded perspective view illustrating a rotator side connector housing section of the rotary connector device according to a third embodiment of the present invention in a disassembled state, and FIG. 4B is a partially enlarged perspective view illustrating the rotator side connector housing section of the rotary connector device according to the third embodiment of the present invention in an assembled state.

DESCRIPTION OF EMBODIMENTS

Hereinafter, a rotary connector device according to embodiments of the present invention will be described with reference to the drawings. Note that the rotary connector device according to the present embodiment electrically connects a steering wheel and a steering shaft, which are steering devices in vehicles such as four-wheeled automobiles.

Figure 1:
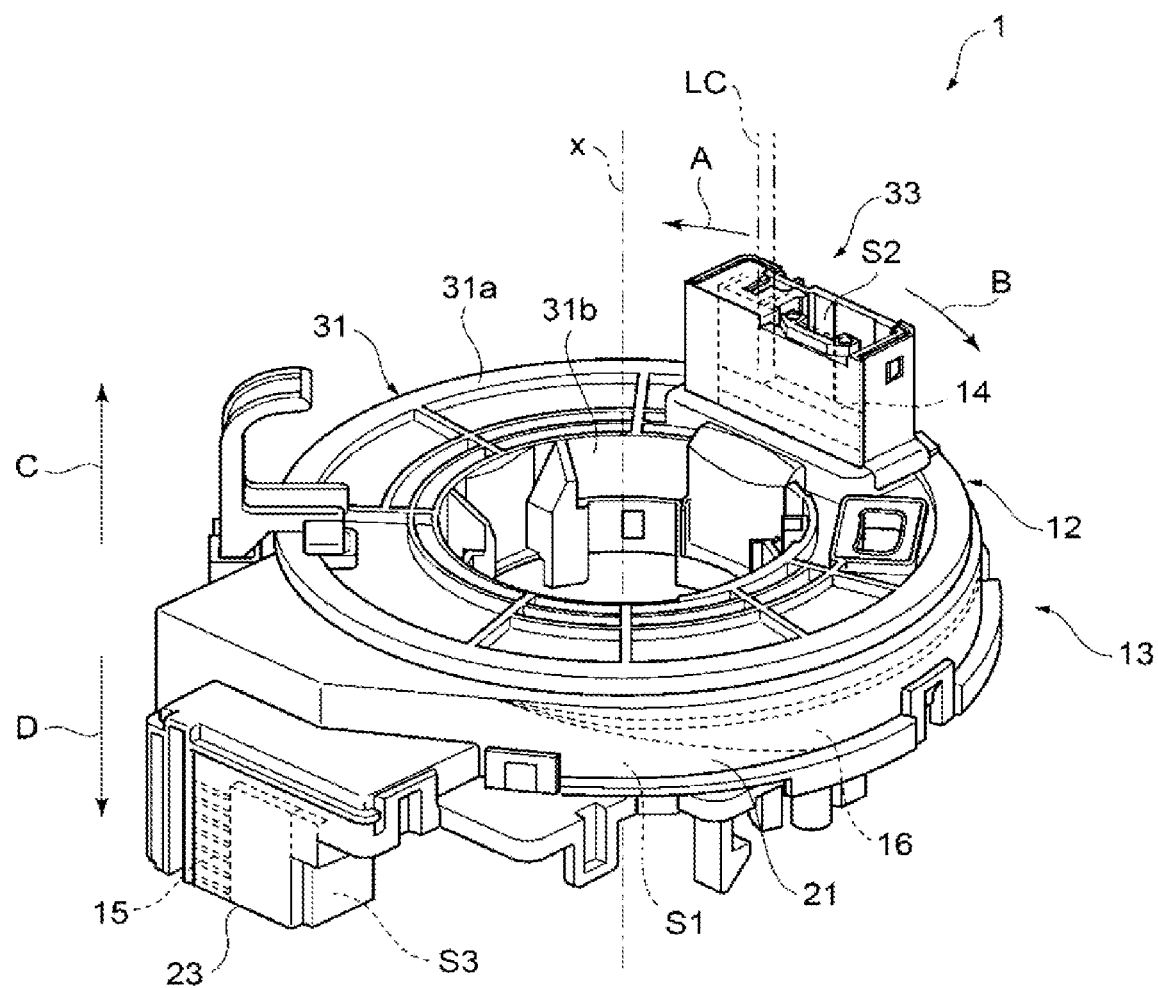
FIG. 1 is a perspective view illustrating a schematic configuration of a rotary connector device according to a first embodiment of the present invention.

First, with reference to FIG. 1, a configuration of a rotary connector device 1 according to a first embodiment of the present invention will be described. FIG. 1 is a perspective view illustrating a schematic configuration of the rotary connector device 1 according to a first embodiment of the present invention.

As illustrated in FIG. 1, the rotary connector device 1 according to the first embodiment of the present invention includes a rotator 12 and a stator 13 that is a member configured to hold the rotator 12 rotatably around an axis line x and forms an annular space (annular space S1) around the axis line x between the rotator 12 and the stator 13. In addition, the rotary connector device 1 includes a rotator side connector 14 configured to enable an electrical connection with the outside in the rotator 12, a stator side connector 15 configured to enable an electrical connection with the outside in the stator 13, and a flexible cable 16 that is a flexible flat cable configured to be housed within the annular space S1 and electrically connected to the rotator side connector 14 and the stator side connector 15. In the vehicle, the stator 13 is fixed to the steering shaft, and the rotator 12 is attached to the steering wheel.

The rotator 12 includes a rotator main body 31 that is an annular member surrounding the axis line x (the direction of arrow A and the direction of arrow B in FIG. 1) and a rotator side connector housing section 33 forming a rotator side connector housing space S2 for housing the rotator side connector 14, the rotator side connector housing space S2 being a space opened to this annular space S1 and the outside of this annular space S1. Specifically, as illustrated in FIG. 1, the rotator main body 31 includes a top plate 31a which is a hollow disc-shaped portion or a substantially hollow disc-shaped portion centered on the axis line x, and a cylindrically shaped cylindrical portion 31b that extends from the end portion on the inner circumferential side of the top plate 31a toward the annular space S1 along the axis line x. The top plate 31a defines a portion facing upward (the direction of arrow C in FIG. 1) in the rotary connector device 1. The cylindrical portion 31b is formed so as to be rotatably engaged with the corresponding portion of the stator 13 with respect to the axis line x.

The rotator side connector housing section 33 is formed so as to be able to hold the rotator side connector 14 and includes a connector holding section 311 protruding from the rotator main body 31 to outside of the annular space S1 and a cover member 312 configured to at least partially cover the connector holding section 311 on a peripheral surface along a direction (the direction of the axis line x) in which the connector holding section 311 protrudes. The details of the rotator side connector housing section 33 will be described later.

Specifically, the stator 13 includes a stator main body 21, a stator side connector 15, and a stator side connector housing section 23. The stator main body 21 includes an engagement hole (not illustrated) that is a circular hole centered on an axis line x and has an annular or substantially annular shape centered on the axis line x. The stator side connector 15 enables electrical connections with the outside for the rotary connector device 1. The stator side connector housing section 23 forms a stator side connector housing space S3 for housing the stator side connector 15. The engagement hole formed in the stator main body 21 is formed so as to be able to house the lower end portion (the direction of arrow D in FIG. 1) of the cylindrical portion 31b of the rotator 12 and engage with this end portion. The rotator 12 is rotatably engaged with the engagement hole of the stator main body 21 of the stator 13 at the lower end portion of the cylindrical portion 31b, and in this way the rotator 12 is rotatably held by the stator 13.

As described above, since the rotator 12 is attached to the stator 13 in the engagement hole, the annular space S1 is defined by the top plate 31a and the cylindrical portion 31b of the rotator 12 and the stator main body 21 of the stator 13.

Figure 2A:
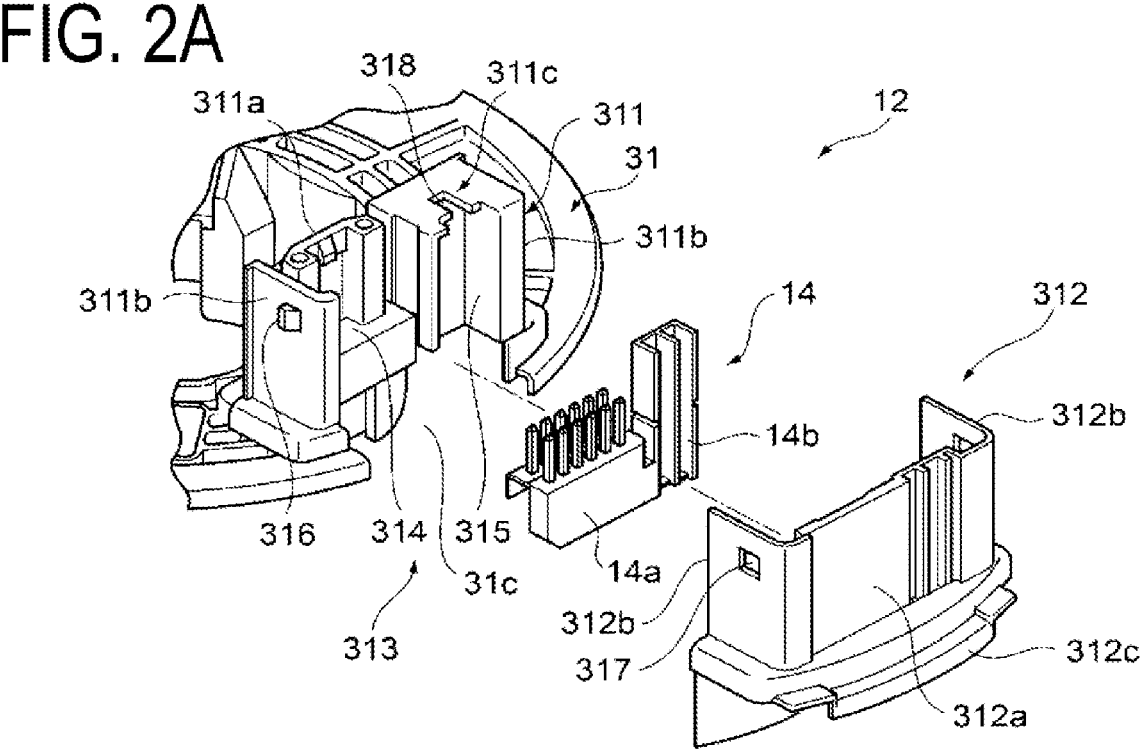
FIGS. 2A and 2B are partially enlarged views of the rotary connector device illustrated in FIG. 1, where
Figure 2B:
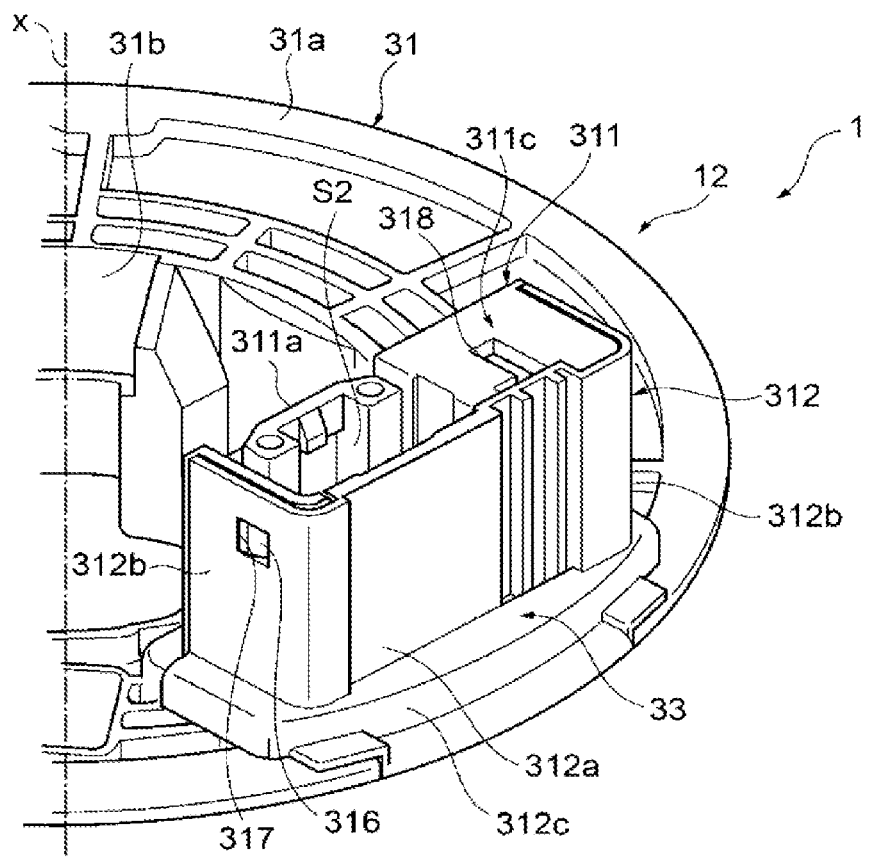

Next, the configuration of the rotator side connector housing section 33 in the rotary connector device 1 will be described in detail with reference to FIG. 2A and FIG. 2B. FIGS. 2A and 2B are partially enlarged views of the rotary connector device 1 illustrated in FIG. 1, where FIG. 2A is a partially exploded perspective view illustrating the rotator side connector housing section 33 of the rotary connector device illustrated in FIG. 1 in a disassembled state, and FIG. 2B is a partially enlarged perspective view illustrating the rotator side connector housing section 33 of the rotary connector device 1 illustrated in FIG. 1 in an assembled state.

In the rotator side connector housing section 33, a concave portion 313 opened to an outer circumferential side is formed in the connector holding section 311, and the rotator side connector 14 is held in the concave portion 313. The cover member 312 is a member configured to cover the concave portion 313 from the outer circumferential side, and a rotator side connector housing space S2 is defined by the cover member 312 covering the connector holding section 311. The connector holding section 311 is integrally formed together with the rotator main body 31 with an insulating resin such as fluororesin, and the cover member 312 is at least partially in close contact with the connector holding section 311 to seal the connector holding section 311 on the outer peripheral surface.

More specifically, as illustrated in FIG. 2A and FIG. 2B, the concave portion 313 includes a connector portion housing recess 314 and a cable portion housing recess 315 formed therein. In the connector portion housing recess 314, a connector portion 14a that is a portion of the rotator side connector 14 to be connected to a cable drawn from the switches of the steering wheel is held. In the cable portion housing recess 315, a cable connection portion 14b that is a portion of the rotator side connector 14 to be connected to an electric circuit such as an air bag device attached to the steering wheel and to which a lead cable or the like of an air bag connector is connected is held.

In addition, the connector holding section 311 includes an inner side peripheral wall 311a, which is a wall-shaped (plate shaped) member that forms a peripheral surface extending along the protruding direction (the direction of arrow C in FIG. 1) of the connector holding section 311, and a pair of side peripheral walls 311b. The inner side peripheral wall 311a forms a peripheral surface facing the inner circumferential side, and the side peripheral walls 311b form a peripheral surface extending perpendicularly or substantially perpendicularly with respect to the inner side peripheral wall 311a from the end portion of the circumferential direction of the inner side peripheral wall 311a toward the outer circumferential side. The concave portion 313 is defined by the inner side peripheral wall 311a and the pair of side peripheral walls 311b. In addition, as illustrated in FIG. 2A, the concave portion 313 is also open with respect to the rotator main body 31. More specifically, the concave portion 313 is not covered by the rotator main body 31 from below in the direction of the axis line x (in the direction of the arrow C), and is not covered by the rotator main body 31 from the outer circumferential side. That is, the rotator main body 31 includes a notch 31c forming a space in the portion in contact with the concave portion 313 and the portion on the outer circumferential side thereof. On the side peripheral walls 311b, locking claws 316 capable of locking with locking holes 317 of the cover member 312, which will be described later, are each formed on the outer side (one side omitted). When the cover member 312 is attached to the connector holding section 311, the locking claws 316 bend and deform until their position aligns with the locking holes 317, and when the positions match, the locking claws 316 return from the bent deformation so as to engage with the locking holes 317. In addition, the connector holding section 311 includes a planar upper side partition portion 311c covering the cable portion housing recess 315 of the concave portion 313 from above and extending in a direction orthogonal or substantially orthogonal to the axis line x. The upper side partition portion 311c is connected to the upper end portion of the side peripheral wall 311b on a corresponding side at one lateral end portion. In addition, a penetrating concave portion 318 opening through the upper side partition portion 311c is formed in the upper side partition portion 311c. The penetrating concave portion 318 is recessed from the end portion of the outer circumferential side toward the inner circumferential side so as to open toward the outer circumferential side. In the rotary connector device 1, since a cable is passed through the penetrating concave portion 318 as described later, the penetrating concave portion 318 is formed such that this cable can be passed through.

The cover member 312 is a member configured to cover the concave portion 313 of the connector holding section 311 from the outer circumferential side, and the rotator side connector housing space S2 is formed by the cover member 312 covering the connector holding section 311. More specifically, the cover member 312 forms an outer side peripheral wall portion 312a and side peripheral wall portions 312b. The outer side peripheral wall portion 312a is a wall-shaped (plate shaped) member that forms a peripheral surface facing the outer circumferential side among the peripheral surfaces along the protruding direction of the connector holding section 311 (the direction of the arrow C in FIG. 1) in the rotator side connector housing section 33. The side peripheral wall portions 312b are wall-shaped (plate shaped) members and form a pair of peripheral surfaces perpendicular or substantially perpendicular with respect to the outer side peripheral wall portion 312a from the end portion in the circumferential direction of the outer side peripheral wall portion 312a toward the inner circumferential side. These three wall surfaces cover the concave portion 313.

In addition, the cover member 312 includes, on the lower side (the direction of the arrow D), a skirt portion 312c that comes into close contact with the outer circumferential end portion of the rotator main body 31 for sealing a space formed by the notch 31c at the outer circumferential end portion of the rotator main body 31. Specifically, the skirt portion 312c is formed on the lower side or the lower end of the outer side peripheral wall portion 312a, and is formed so as to come into close contact with the outer circumferential end portion of the rotator main body 31 from above (in the direction of the arrow D) on both end sides in the circumferential direction of the notch 31c of the rotator main body 31. For example, the skirt portion 312c includes a surface on the lower side that corresponds to the upper surface of the outer circumferential end portion of the rotator main body 31.

As illustrated in FIG. 2B, in the rotator side connector housing section 33 in which the connector holding section 311 is covered by the cover member 312, the outer side peripheral wall portion 312a of the cover member 312 is located at the open portion of the concave portion 313 of the connector holding section 311. That is, the inner side peripheral wall 311a of the concave portion 313 of the connector holding section 311 and the outer side peripheral wall portion 312a of the cover member 312 do not overlap with each other, and are opposed to each other with an interval therebetween in the directions of the outer circumferential side and the inner circumferential side that intersect the axis line x. The connector holding section 311 and the cover member 312 are formed such that the connector holding section 311 and the cover member 312 overlap only at the pair of side peripheral wall 311b and the side peripheral wall portion 312b. In addition, the skirt portion 312c of the cover member 312 is in close contact with the rotator main body 31 and covers the notch 31c. Further, as illustrated in FIG. 2B, in the rotator side connector housing section 33, the upper side partition portion 311c of the connector holding section 311 is in contact with the upper edge portion of the outer side peripheral wall portion 312a of the cover member 312 at the end portion on the outer circumferential side, and the cable portion housing recess 315 of the concave portion 313 is covered by the upper side partition portion 311c on the upper side.

Furthermore, on the side peripheral wall portions 312b of the cover member 312, locking holes 317 capable of locking with the locking claws 316 of the above-described connector holding section 311 are each formed (one side omitted). When the cover member 312 reaches a desired fitting position (the position illustrated in FIG. 2B) with respect to the connector holding section 311, the locking claws 316 engage with the locking holes 317 and lock, and the cover member 312 is attached to the connector holding section 311. Known engaging or locking means can be applied as the locking claws 316 and the locking holes 317.

Next, a method of forming the rotator side connector housing section 33; that is, a method of attaching the cover member 312 to the connector holding section 311 will be described with reference to FIG. 2A and FIG. 2B. The rotator side connector housing section 33 is formed by fitting the cover member 312 into the connector holding section 311.

In formation of the rotator side connector housing section 33, first, the rotator side connector 14 is housed in the connector holding section 311, and held by the connector holding section 311. Specifically, the rotator side connector 14 and a lead cable LC (see FIG. 1) for airbag connection that is connected by welding or the like to the cable connection portion 14b of the rotator side connector 14 are housed in the connector portion housing recess 314 and the cable portion housing recess 315 from below in the direction of the axis line x of the rotary connector device 1.

Note that a lead cable LC equipped with an air bag connector for connection to an electric circuit, such as an airbag device attached to a steering wheel, is connected in advance by welding or the like to the cable connection portion 14b of the rotator side connector 14. When the rotator side connector 14 is housed in the connector holding section 311, since the lead cable LC extends downward, the lead cable LC is folded back to extend upward, and is housed in the cable portion housing recess 315 so as to pass through it. In this way, the lead cable LC is extended upward from the penetrating concave portion 318 formed in the upper side partition portion 311c of the connector holding section 311.

Then, to attach the cover member 312 to the connector holding section 311, the cover member 312 is moved from the outer circumferential side to cover the connector holding section 311, and is moved so that the end portions on the inner circumferential side of the side peripheral wall portions 312b of the cover member 312 overlap with the end portions on the outer circumferential side of the side peripheral walls 311b of the connector holding section 311, respectively. When the cover member 312 is moved further, the locking claws 316 of the connector holding section 311 come into contact with the side peripheral wall portions 312b of the cover member 312, and the locking claws 316 bend and deform toward the inside of the rotator side connector housing space S2. Then, when the cover member 312 moves to the desired fitting position (the fitting position illustrated in FIG. 2B) with respect to the connector holding section 311, the locking claws 316 of the connector holding section 311 and the locking holes 317 of the cover member 312 overlap with each other, the bending deformation of the locking claws 316 is eliminated, the locking claws 316 engage with the locking holes 317 and lock, the cover member 312 is fixed to the connector holding section 311, the rotator side connector housing section 33 is formed, and the rotator side connector housing space S2 is formed.

It is preferable that the spacing between the inner side surfaces of the pair of side peripheral wall portions 312b of the cover member 312 be the same as the spacing between the outer side surfaces of the pair of side peripheral walls 311b of the connector holding section 311, or alternatively, less than the spacing between the outer side surfaces of the pair of side peripheral walls 311b of the connector holding section 311. This is because, when the cover member 312 is attached to the connector holding section 311, the side peripheral wall portions 312b and the side peripheral walls 311b are brought into close contact with each other.

In this way, by attaching the cover member 312 to the connector holding section 311 and covering the concave portion 313 of the connector holding section 311 and the notch 31c of the rotator main body 31 with the cover member 312, it is possible to prevent gaps, holes, grooves, and the like that communicate with the interior of the rotator side connector housing space S2 and allow liquid to enter the rotator side connector housing space S2 from forming in the rotator side connector housing section 33. In known rotary connector devices, rotator side connector housing sections having complex shapes are formed as a single unit by injection molding, and gaps, holes, grooves, and the like that communicate with the interior of the rotator side connector housing space are formed in the rotator side connector housing section. For this reason, there are cases where liquid enters the rotator side connector housing space in known rotary connector devices, but in the rotary connector device 1 according to the first embodiment of the present invention, as described above, a rotator side connector housing section 33 is formed by covering the concave portion 313 of the connector holding section 311 and the notch 31c of the rotator main body 31 with a cover member 312 that does not have through-holes or grooves formed therein, and no liquid enters the rotator side connector housing space S2 via the cover member 312 that forms the outer peripheral wall of the rotator side connector housing section 33.

In this way, in the rotary connector device 1 according to the first embodiment of the present invention, it is possible to suppress liquid from entering the rotator side connector housing section 33 and to prevent green rust from occurring on the rotator side connector 14, the flexible cable 16, and the like.

In addition, a concave portion 313 opened to the outer circumferential side of the rotator main body 31 is formed in the connector holding section 311, and the outer side peripheral wall portion 312a of the cover member 312 is located in the opened portion (see FIG. 2). This reduces the area where the connector holding section 311 and the cover member 312 overlap, and thus can suppress the increase in the weight of the rotary connector device 1 due to the enlargement of the rotator side connector housing section 33.

Furthermore, when attaching the cover member 312 to the connector holding section 311, the locking claws 316 formed on the connector holding section 311 engage with the locking holes 317 formed in the cover member 312, whereby the cover member 312 is set to a desired attachment position. Accordingly, the attaching operation of the cover member 312 can be simplified.

Although the rotary connector device 1 was described that includes the locking claws 316 and the locking holes 317 for attaching the cover member 312 to the connector holding section 311, the locking means of the rotary connector device 1 for attaching the cover member 312 to the connector holding section 311 is not limited to the locking claws 316 and the locking holes 317. The rotary connector device 1 may include other locking means. In addition, the rotary connector device 1 may not have locking means such as the locking claws 316 and the locking holes 317, and the cover member 312 may be held by the connector holding section 311 by being fit between the side peripheral walls 311b and the side peripheral wall portion 312b.

In addition, as illustrated in FIG. 2A, the side peripheral wall portion 312b of the cover member 312 may not need to be extended to the same size as that of the side peripheral wall 311b of the connector holding section 311. Similarly, as illustrated in FIG. 2A, the side peripheral wall 311b of the connector holding section 311 may not need to be extended to the same size as that of the side peripheral wall portion 312b of the cover member 312. Either one of the side peripheral wall 311b of the connector holding section 311 or the side peripheral wall portion 312b of the cover member 312 may extend so as to cover the entire side portion of the rotator side connector housing space S2.

Figure 3A:
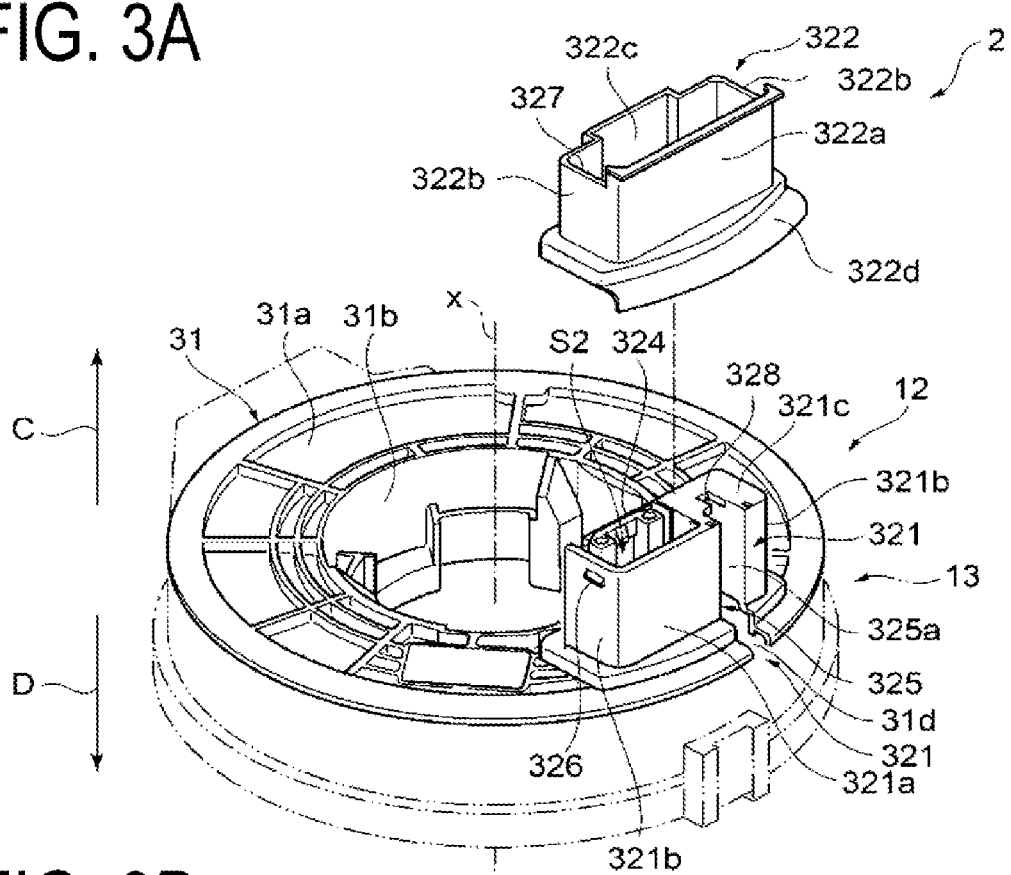
FIGS. 3A and 3B are perspective views illustrating a schematic configuration of a rotary connector device according to a second embodiment of the present invention, where
Figure 3B:
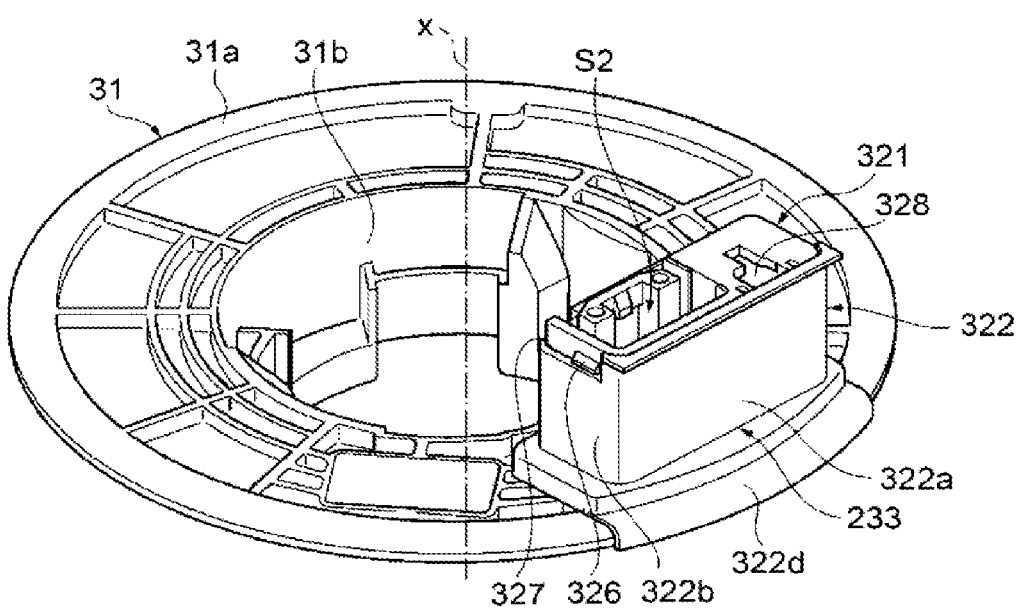

Next, a rotary connector device 2 according to a second embodiment of the present invention will be described with reference to FIG. 3A and FIG. 3B. FIGS. 3A and 3B are perspective views illustrating a schematic configuration of a rotary connector device 2 according to the second embodiment of the present invention, where FIG. 3A is a partially exploded perspective view illustrating a connector housing section of the rotary connector device 2 according to the second embodiment of the present invention in a disassembled state, and FIG. 3B is a partially enlarged perspective view illustrating the connector housing section of the rotary connector device 2 according to the second embodiment of the present invention in an assembled state.

Note that the rotary connector device 2 according to the second embodiment of the present invention includes an improved version of the rotator side connector housing section 33 of the rotary connector device 1 according to the first embodiment of the present invention, and the configuration of the other components is similar. Accordingly, in the following description, configurations that are the same or similar as the rotary connector device 1 according to the first embodiment of the present invention described above are denoted by the same reference numerals as the rotary connector device 1 described above and the description thereof is omitted, and only different configurations will be described.

As illustrated in FIG. 3A and FIG. 3B, the rotator side connector housing section 233 includes a rotator side connector housing space S2 therein, and is provided with a connector holding section 321 integrally formed together with the rotator main body 31 with an insulating resin such as fluororesin, and a cover member 322 that is a member configured to cover the entire peripheral surface of the connector holding section 321.

The rotator side connector 14 (see FIG. 2A) is held in the connector housing space S2 of the connector holding section 321. More specifically, the rotator side connector housing space S2 opens thorough the rotator main body 31 in the direction of the axis line x of the rotary connector device 2, and includes a connector portion housing space portion 324 and a cable portion housing space portion 325. In the connector portion housing space portion 324, a connector portion 14a, which is a portion of the rotator side connector 14 to be connected to a cable drawn from the switches of the steering wheel, is held. In the cable portion housing space portion 325, a cable connection portion 14b that is a portion of the rotator side connector 14 to be connected to an electric circuit such as an air bag device attached to the steering wheel and to which a lead cable equipped with an air bag connector is connected is held.

Unlike the connector holding section 311 of the rotary connector device 1 described above, the connector holding section 321 of the rotary connector device 2 also includes a wall member on the outer circumferential side thereof. The connector portion housing space portion 324 is not opened to the outer circumferential side and is covered and closed by the wall member throughout the entire periphery. As illustrated in FIG. 3A, the connector holding section 321 includes an outer peripheral wall 321a, which is a wall-shaped (plate shaped) member that partially forms a peripheral surface located on the outer circumferential side of the rotator main body 31 among the peripheral surfaces along the protruding direction (the direction of the arrow C) of the connector holding section 321. The outer side peripheral wall 321a of the connector holding section 321 is connected to the outer circumferential side end portion of an upper side partition portion 321c on the inner side thereof, and on the peripheral surface on the outer circumferential side of the connector holding section 321, the rotator side connector housing space S2 is opened only in a cable threading groove 325a, which is a groove communicating with the cable portion housing space portion 325 for passing the lead cable or the like of the air bag connector. In addition, as illustrated in FIG. 3A, in the connector housing space S2, only the cable portion housing space portion 325 is not covered by the rotator main body 31 from the outer circumferential side. That is, the cable threading groove 325a extends through the rotator main body 31, which forms a notch 31d in the rotator main body 31. Note that, similar to the above-described rotary connector device 1, the connector portion housing space portion 324 and the cable portion housing space portion 325 are not covered by the rotator main body 31 from below (in the direction of the arrow C).

In addition, similarly to the above-described rotary connector device 1, a penetrating concave portion 328 opening through the upper side partition portion 321c is formed in the upper side partition portion 321c, the penetrating concave portion 328 being recessed from the end portion on the outer circumferential side toward the inner circumferential side so as to open toward the outer circumferential side. In the rotary connector device 2, since a cable is passed through the penetrating concave portion 328 as described later, the penetrating concave portion 328 is formed such that this cable can be passed through.

In addition, locking protrusions 326 that can come into contact with protrusion contact portions 327 of the cover member 322 (described later) are respectively formed on a pair of side peripheral walls 321b of the connector holding section 321 (one side omitted). The locking protrusions 326 are formed so as to be in contact with the protrusion contact portions 327 when the cover member 322 reaches a desired fitting position (the position illustrated in FIG. 3B) with respect to the connector holding section 321.

The cover member 322 is a cylindrical member having a substantially rectangular shape in a cross section perpendicular to the axis line x and is opened in the direction of the axis line x, and is formed so as to cover the connector holding section 321 over the entire peripheral surface along the protruding direction (the direction of the arrow C) of the connector holding section 321. In addition, the cover member 322 includes a skirt portion 322d configured to come into close contact with the outer circumferential end portion of the rotator main body 31 for sealing a space formed by the notch 31d of the rotator main body 31. In this way, the cover member 322 is formed so as to cover the entire peripheral surface of the connector holding section 321 and the notch 31d of the rotator main body 31 so as to suppress liquid from entering the rotator side connector housing space S2 even in a case where liquid flowing from a gap between the steering lower cover and the steering column cover flows around the peripheral surface of the cover member 322.

Specifically, the cover member 322 includes an outer side peripheral wall portion 322a, an inner side peripheral wall portion 322c, and a pair of side peripheral wall portions 322b. The outer side peripheral wall portion 322c is a wall-shaped (plate-shaped) member forming a peripheral surface on the outer circumferential side. The inner side peripheral wall portion 322c is a wall-shaped (plate-shaped) member forming a peripheral surface on the inner circumferential side and opposed to the outer side peripheral wall portion 322a. The pair of side peripheral wall portions 322b each connect the side end portions of the outer side peripheral wall portion 322a and the side end portions of the inner side peripheral wall portion 322c. In addition, protrusion contact portions 327 that can come into contact with the above-described locking protrusions 326 are respectively formed on the side peripheral wall portions 322b of the cover member 322 (one side omitted). More specifically, the upper end portions of the side peripheral wall portions 322b are formed such that the locking protrusions 326 formed on the side peripheral walls 321b of the connector holding section 321 engage with the upper end portions when the cover member 322 is in contact with the top plate 31a of the rotator main body 31 at the lower end portion of the cover member 322. When the cover member 322 reaches a desired fitting position (the position illustrated in FIG. 3B) with respect to the connector holding section 321, the locking protrusions 326 are in contact with the protrusion contact portions 327.

Also, specifically, the skirt portion 322d is formed on the lower side or the lower end of the outer side peripheral wall portion 322a, and is formed so as to come into close contact with the outer circumferential end portion of the rotator main body 31 from above (in the direction of the arrow D) on both end sides of the circumferential direction of the notch 31d of the rotator main body 31. For example, the skirt portion 322d includes a surface on its lower side that corresponds to the upper surface of the outer circumferential end portion of the rotator main body 31.

Next, a method of forming the rotator side connector housing section 233 will be described with reference to FIG. 3A and FIG. 3B. The rotator side connector housing section 233 is formed by attaching the cover member 322 to the connector holding section 321.

In formation of the rotator side connector housing section 233, first, the rotator side connector 14 (see FIG. 2A) is housed in the connector holding section 321, and held by the connector holding section 321. Specifically, the rotator side connector 14 and an airbag cable or the like, which is omitted in the drawings, are housed in the connector portion housing space portion 324 and the cable portion housing space portion 325 from below in the direction of the axis line x of the rotary connector device 2 (the direction of the arrow C in FIG. 3A).

Note that a lead cable equipped with an air bag connector (not illustrated) for connection to an electric circuit, such as an airbag device attached to a steering wheel, is connected in advance by welding or the like to the rotator side connector 14. As in the case of the above-described rotary connector device 1, when the rotator side connector 14 is housed in the connector holding section 321, since the lead cable extends downward from the cable portion housing space portion 325, the lead cable is folded back to extend upward, and be housed in the cable portion housing space portion 325 and the cable threading groove 325a so as to pass through the cable portion housing space portion 325. In this way, this lead cable is extended upward from the penetrating concave portion 328 formed in the upper side partition portion 321c of the connector holding section 321.

Next, to fit the cover member 322 to the connector holding section 321, the cover member 322 is moved from above the rotary connector device 2 in the axis line x direction to below. When the cover member 322 is moved further, the side peripheral wall portions 322b of the cover member 322 come into contact with the locking protrusions 326, and the locking protrusions 326 bend and deform toward the inside of the rotator side connector housing space S2. Then, when the cover member 322 reaches the desired fitting position (the fitting position illustrated in FIG. 3B) with respect to the connector holding section 321, the bending deformation of the locking protrusions 326 is eliminated, the locking protrusions 326 are in contact with the protrusion contact portions 327, and the rotator side connector housing space S2 is formed. At this time, the skirt portion 322d of the cover member 322 covers the notch 31d of the rotator main body 31, and seals the space formed by the notch 31d.

In addition, when the cover member 322 is fitted to the connector holding section 321, since the desired fitting position is achieved as a result of the locking protrusions 326 formed on the connector holding section 321 in contact with the protrusion contact portions 327 formed on the cover member the operator who performs the fitting can readily ascertain whether the desired fitting position has been achieved, and this allows the attachment operation to be simple.

Accordingly, similarly to the rotary connector device 1 according to the first embodiment of the present invention, in the rotary connector device 2 according to the second embodiment of the present invention as well, it is possible to suppress liquid from entering the rotator side connector housing section 233 and to prevent green rust from occurring on the rotator side connector 14, the flexible cable 16, and the like.

Figure 4A:
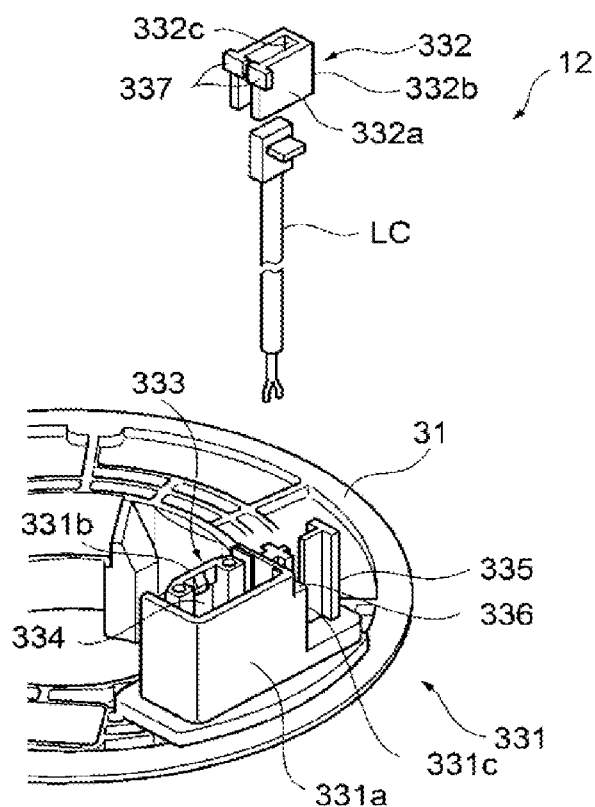
FIGS. 4A and 4B are perspective views illustrating a schematic configuration of a rotary connector device according to a third embodiment of the present invention, where
Figure 4B:
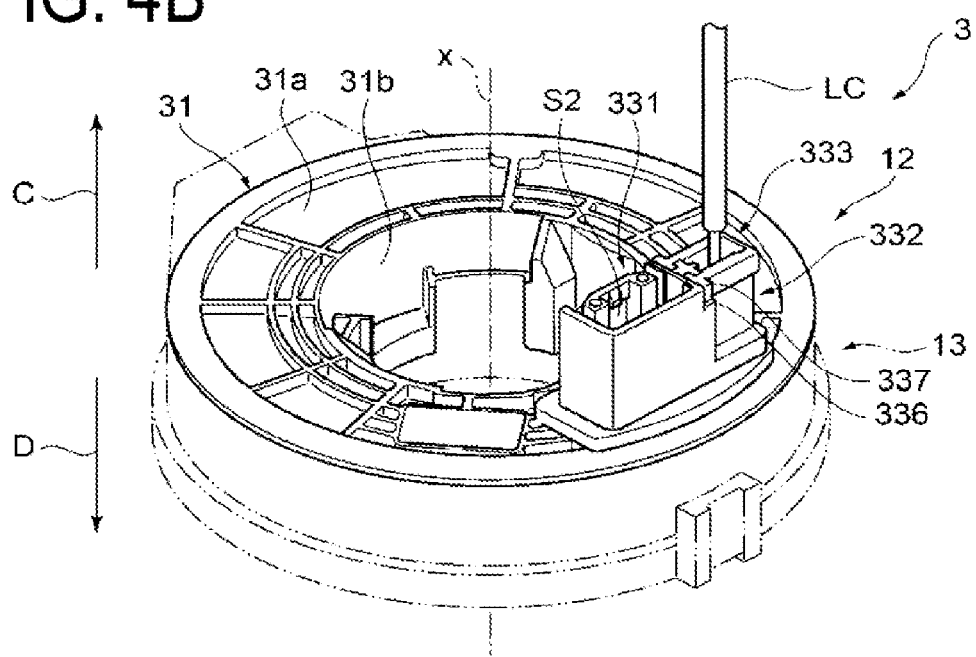

Next, a rotary connector device 3 according to a third embodiment of the present invention will be described with reference to FIG. 4A and FIG. 4B. FIGS. 4A and 4B are perspective views illustrating a schematic configuration of a rotary connector device 3 according to the third embodiment of the present invention, where FIG. 4A is a partially exploded perspective view illustrating a rotator side connector housing section of the rotary connector device according to the third embodiment of the present invention in a disassembled state, and FIG. 4B is a partially enlarged perspective view illustrating the connector housing section of the rotary connector device 3 according to the third embodiment of the present invention in an assembled state.

Note that the rotary connector device 3 according to the third embodiment of the present invention includes an improved version of the rotator side connector housing section 33 of the rotary connector device 1 according to the first embodiment of the present invention, and the configuration of the other components is similar. Accordingly, in the following description, components that are the same or similar to those of the above-described rotary connector device 1 are denoted by the same reference numerals and the description thereof is omitted, and different portions will be described.

As illustrated in FIG. 4A and FIG. 4B, a rotator side connector housing section 333 includes a rotator side connector housing space S2 therein, and includes a connector holding section 331 integrally formed together with the rotator main body 31 with an insulating resin such as fluororesin, and a cover member 332 that is a member configured to cover a cable portion housing space portion 335 that will be described later.

The rotator side connector 14 (see FIG. 2A) is held in the rotator side connector housing space S2 of the connector holding section 331. More specifically, the rotator side connector housing space S2 opens through the rotator main body 31 in the direction of the axis line x of the rotary connector device 3, and includes a connector portion housing space portion 334 and a cable portion housing space portion 335. In the connector portion housing space portion 334, a connector portion 14a that is a portion of the rotator side connector 14 to be connected to a cable drawn from the switches of the steering wheel is held. In the cable portion housing space portion 335, a cable connection portion 14b that is a portion of the rotator side connector 14 to be connected to an electric circuit such as an air bag device attached to the steering wheel and to which a lead cable or the like equipped with air bag connector is connected is held.

In addition, locking grooves 336 to be engaged with groove locking protrusions 337 of the cover member 332 to be described later are formed at the boundary between the connector portion housing space portion 334 and the cable portion housing space portion 335 in the connector holding section 331. This locking grooves 336 are formed so as to lock with the groove locking protrusions 337 when the cover member 332 reaches a desired fitting position (the position illustrated in FIG. 4B) with respect to the connector holding section 331.

More specifically, unlike the connector holding section 311 of the rotary connector device 1 described above, the connector holding section 331 of the rotary connector device 3 also includes a wall member on the outer circumferential side thereof. The connector portion housing space portion 334 is not opened to the outer circumferential side, and is covered and closed by the wall member throughout the entire periphery. As illustrated in FIG. 4A, the connector holding section 331 includes an outer peripheral wall 331a, which is a wall-shaped (plate shaped) member that partially forms a peripheral surface located on the outer circumferential side of the rotator main body 31 among the peripheral surfaces along the protruding direction (the direction of the arrow C) of the connector holding section 331. In addition, a side peripheral wall 331c, which is a wall-shaped (plate-shaped) member, is formed between an end portion closer to the cable portion housing space portion 335 of the outer side peripheral wall 331a of the connector holding section 331 and an end portion closer to the cable portion housing space portion 335 of the inner side peripheral wall 331b that is similar to the inner side peripheral wall 311a and opposes the outer side peripheral wall 331a of the connector holding section 331. A communication hole (not illustrated) that communicates between the connector portion housing space 334 and the cable portion housing space portion 335 is formed on the side peripheral wall 331c such that the cable connection portion 14b of the rotator side connector 14 can enter the cable portion housing space portion 335 from the connector portion housing space 334.

In the connector holding section 331, the open surface facing the outer circumferential side of the cable portion housing space portion 335 is located on the inner circumferential side from the outer side peripheral wall 331a in a radial direction orthogonal to the axis line x. In addition, in the connector holding section 331, the portion that forms the bottom portion (the peripheral wall on the inner circumferential side) of the cable portion housing space portion 335 may be located on the outer circumferential side from the portion that forms the bottom portion (the inner side peripheral wall 331b) of the connector portion housing space 334. In addition, unlike the connector holding sections 311 and 321 in the above-described rotary connector devices 1 and 2, the connector holding section 331 does not include a notch opening through the rotator main body 31 at the outer circumferential end portion of the rotator main body 31, and no space communicating with the connector portion housing space 334 and the cable portion housing space portion 335 is formed at the outer circumferential end portion of the rotator main body 31.

The cover member 332 is a member configured to cover the cable portion housing space portion 335 formed in the connector holding section 331 in a range extending in the circumferential direction, and the groove locking protrusions 337 configured to lock with the locking grooves 336 of the connector holding section 331 when the cover member 332 covers the cable portion housing space portion 335 are formed. When the cover member 332 reaches a desired fitting position (the position illustrated in FIG. 4B) with respect to the connector holding section 331, the groove locking protrusions 337 lock with the locking grooves 336. Specifically, the cover member 332 is a member having a substantially U-shaped cross section perpendicular to the axis line x, and includes an outer side peripheral wall portion 332a, an inner side peripheral wall portion 332c, and a side peripheral wall 332b. The outer side peripheral wall portion 332a is a wall-shaped (plate-shaped) member that forms a part of the peripheral surface on the outer circumferential side of the rotator side connector housing section 333, the inner side peripheral wall portion 332c is a wall-shaped (plate-shaped) member that forms a part of the peripheral surface on the inner circumferential side of the rotator side connector housing section 333 that opposes the outer side peripheral wall portion 332a, and the side peripheral wall 332b is a wall-shaped (plate-shaped) member that forms a side peripheral surface not closer to the connector portion housing space portion 334 of the rotator side connector housing section 333. The above-described groove locking protrusions 337 are respectively formed on the side end portions on the open sides of the outer side peripheral wall portion 332a and the inner side peripheral wall portion 332c of the cover member 332.

The locking grooves 336 with which the groove locking protrusions 337 engage are formed in the side peripheral wall portion 331c. The locking grooves 336 are provided in the side peripheral wall portion 331c so as to engage with the groove locking protrusions 337 when the cover member 332 reaches a desired fitting position (the position illustrated in FIG. 4B) with respect to the connector holding section 331.

Next, a method of forming the rotator side connector housing section 33 will be described with reference to FIG. 4A and FIG. 4B. The rotator side connector housing section 333 is formed by attaching the cover member 332 to the connector holding section 331.

In formation of the rotator side connector housing section 333, first, the rotator side connector 14 (see FIG. 2) is housed in the connector holding section 331, and held by the connector holding section 331. Specifically, the connector portion 14a of the rotator side connector 14 is housed in the connector portion housing space portion 334 from below in the direction of the axis line x of the rotary connector device 3 (the direction of the arrow C in FIG. 1), and the cable connection portion 14b of the rotator side connector 14 is housed in the cable portion housing space portion 335. At this time, a lead cable equipped with an air bag connector for connection to an electronic circuit, such as an airbag device, is not connected to the cable connection portion 14b of the rotator side connector 14.

Next, a lead cable LC equipped with an air bag connector for connection to an electric circuit, such as an airbag device attached to a steering wheel, is connected to the cable connection portion 14b of the rotator side connector 14. The connector holding section is integrally formed with the rotator main body 31 so as not to form gaps, holes, grooves, or the like with respect to the liquid intrusion direction. Accordingly, unlike the rotator side connector housing sections 33 and 233 described above, a lead cable LC is not connected to the rotator side connector 14 in advance, but instead the lead cable LC is brought close to the rotator main body 31 from above (the side of the direction of the arrow C), and the lead cable LC is welded to the cable connection portion 14b of the rotator side connector 14 after housing the rotator side connector 14 in the connector holding section 331.

Then, the member 332 is fixed to the connector holding section 331. Specifically, by engaging and locking the groove locking protrusions 337 with the locking grooves 336, the cover member 332 is locked to the connector holding section 331, and the cable portion housing space portion 335 is covered by the cover member 332. In this way, the connector portion housing space portion 334 is covered by the peripheral wall, and the cable portion housing space portion 335 is covered by the cover member 332 in the rotator side connector housing section 333.

Accordingly, similarly to the rotary connector device 1 according to the first embodiment of the present invention, in the rotary connector device 3 according to the third embodiment of the present invention as well, it is possible to suppress liquid from entering the rotator side connector housing section 333, and to prevent green rust from occurring on the rotator side connector 14, the flexible cable 16, and the like.

In addition, in the rotary connector device 3 according to the third embodiment of the present invention, after the rotator side connector 14 is housed in the connector holding section 331 in a state in which the lead cable LC had not been welded to the rotary connector device 14 in advance, the lead cable LC is welded to the cable connection portion 14b of the rotator side connector 14 in the cable portion housing space portion 335. This can simplify the attachment operation of the rotator side connector 14 and the welding operation of the lead cable LC to the rotator side connector 14. In addition, since the lead cable LC is not housed in the connector housing section 333 from below together with the rotator side connector 14 when the rotator side connector 14 is attached, the operation of folding back the lead cable LC so that the lead cable LC extends upward is unnecessary. This can simplify the assembly operation of the rotary connector device 3.

As described above, in the rotary connector devices 1, 2, and 3 according to the embodiments of the present invention, the connector holding sections 311, 321, and 331, and additionally the notches 31c and 31d of the rotator main body 31 in the rotary connector devices 1 and 2, are covered with the cover members 312, 322, and 332 so that the rotator side connector housing space S2 can be sealed. Even in cases when, due to the carelessness of the driver, a liquid such as a beverage, or water caused by dew condensation, enters the gap between the steering column cover and the steering lower cover, this can prevent the liquid from entering the inside of the connector housing section (the rotator side connector housing sections 33, 233, and 333) by the cover members 312, 322, and 332. Accordingly, this can prevent the occurrence of green rust on the connecting portion between the flexible cable 16 and the rotator side connector 14, and prevent an increase in the electrical resistance value. In addition, similarly, this can prevent green rust from occurring on the connecting portion between the lead cable equipped with the air bag connector or the like and the rotator side connector 14, as well as on the connecting portion between the cable or the like drawn out from the switches of the steering wheel and the rotator side connector 14, and prevent an increase in the electrical resistance value.

Particularly, even in a case where holes are formed when the connector holding sections 311, 321, and 331 are insert molded so as to be integrally formed with the rotator main body 31, this can reliably prevent water from entering the inside of the connector housing section (rotator side connector housing sections 33 and 233) by the cover members 312 and 322.

In addition, the cover members 312, 322, and 332 are at least partially in close contact with the connector holding section in order to seal the portion covering the connector holding sections 311, 321, and 331, and this can prevent liquid from entering the connector holding sections 311, 321, and 331.

Although rotary connector devices 1 to 3 according to the embodiments of the present invention have been described above, the rotary connector device according to the present invention is not limited to the rotary connector devices 1 to 3, and all aspects that fall within the concepts of the present invention and the claims are included. In addition, the respective components may be selectively combined as appropriate in order to achieve at least part of the above-described problems and effects. For example, the shape, materials, arrangement, size, and the like of each constituent element in the above embodiments can be appropriately modified according to the specific usage mode of the invention. The configuration of each part can be replaced with a freely-selected configuration that has the same function.

The shapes of the connector holding sections 311, 321, and 331 and the cover members 312, 322, and 332 of the embodiments of the present invention described above are not limited to the illustrated shapes, and can be modified appropriately.

In addition, with respect to the rotator side connector housing section 33 of the above-described embodiments of the present invention, although a mode was described in which the locking claws 316 are formed on the connector holding section 311 and the locking holes 317 are formed in the cover member 312, the locking holes 317 may be formed in the connector holding section 311 and locking protrusions protruding inward the rotator side connector housing space S2 may be formed on the cover member.

Similarly, with respect to the rotator side connector housing section 233 according to the embodiments of the present invention, although a case was described in which the locking protrusions 326 are formed on the connector holding section 321 and the protrusion contact portions 327 are formed on the cover member 322, the protrusion contact portions 327 may be formed on the connector holding section 321, and the locking protrusions 326 may be formed on the inner wall of the cover member 322.

In addition, with respect to the rotator side connector housing section 333 according to the embodiments of the present invention, although a case was described in which the locking grooves 336 are formed in the connector holding section 331 and the groove locking protrusions 337 are formed on the cover member 332, the groove locking protrusions 337 may be formed on the connector holding section 331, and the locking grooves 336 may be formed in the inner wall of the cover member 332.

In addition, the locking means provided in the rotary connector device for attaching the cover member to the connector holding section is not limited to that described above. The rotary connector device according to the present invention may include other locking means. Further, the rotary connector device according to the present invention may not include a locking means, and the cover member may be held by the connector holding section by fitting the cover member to the connector holding section.

REFERENCE SIGNS LIST

1, 2, 3 Rotary connector device
12 Rotator
13 Stator
14 Rotator side connector
15 Stator side connector
16 Flexible cable
21 Stator main body
23 Stator side connector housing section
31 Rotator main body
33, 233, 333 Rotator side connector housing section
311, 321, 331 Connector holding section
312, 322, 332 Cover member
313 Concave portion

The invention claimed is:
1. A rotary electrical connector device comprising:
a rotator;
a stator that is a member configured to hold the rotator rotatably around an axis line and form an annular space around the axis line between the rotator and the stator;
a rotator side connector configured to enable electrical connections in the rotator with at least two cables of two respective external devices;
a stator side connector configured to enable an electrical connection in the stator to an external device; and
a flexible cable that is a flexible flat cable configured to be housed within the annular space and electrically connected to the rotator side connector and the stator side connector, wherein
the rotator includes a rotator main body that is an annular member surrounding the axis line and a connector housing section that is a space opened to the annular space and the outside of the annular space and forms a connector housing space having an outer peripheral wall portion configured to house the rotator side connector, and
the connector housing section is configured to allow the rotator side connector to be held, and includes a connector holding section protruding from the rotator main body to the outside of the annular space, and a cover member that is a member configured to at least partially cover the connector holding section and the connector housing section on a peripheral surface along a direction in which the connector holding section protrudes in such manner that the cover member covers a circumferential side of the electrical connections with the at least two cables.

2. The rotary electrical connector device according to claim 1, wherein a concave portion opened to an outer circumferential side is formed in the connector holding section, and the rotator side connector is held in the concave portion,
the cover member is a member configured to cover the concave portion from the outer circumferential side, and
the connector housing space is formed by the cover member covering the connector holding section.

3. The rotary electrical connector device according to claim 1, wherein the connector holding section includes the connector housing space in the connector holding section, and
the cover member is a member configured to cover an entire peripheral surface of the connector holding section.

4. The rotary electrical connector device according to claim 1, wherein the connector holding section includes the connector housing space in the connector holding section, and includes a cable groove that is a groove extending from the rotator main body toward the outside of the annular space and in which a cable electrically connecting the rotator side connector and an external device is passed, and
the cover member is a member configured to cover the cable groove.

5. The rotary electrical connector device according to claim 1, wherein the connector holding section is integrally formed with the rotator main body.

6. The rotary electrical connector device according to claim 2, wherein the connector holding section is integrally formed with the rotator main body.

7. The rotary electrical connector device according to claim 3, wherein the connector holding section is integrally formed with the rotator main body.

8. The rotary electrical connector device according to claim 4, wherein the connector holding section is integrally formed with the rotator main body.

9. The rotary electrical connector device according to claim 1, wherein the cover member is at least partially in close contact with the connector holding section to seal a portion covering the connector holding section.

10. The rotary electrical connector device according claim 1, wherein the rotator main body and the connector holding section are formed from a resin material.

* * * * *